(12) United States Patent
Alasti et al.

(10) Patent No.: US 12,720,322 B2
(45) Date of Patent: Aug. 25, 2026

(54) SHARING A CELLULAR WIRELESS TELECOMMUNICATION NETWORK RADIO UNIT (RU) BY MULTIPLE MOBILE NETWORK OPERATORS

(71) Applicant: Boost SubscriberCo L.L.C., Englewood, CO (US)

(72) Inventors: Mehdi Alasti, Reston, VA (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 691 days.

(21) Appl. No.: 18/070,105

(22) Filed: Nov. 28, 2022

(65) Prior Publication Data

US 2024/0179536 A1 May 30, 2024

(51) Int. Cl.
*H04W 16/14* (2009.01)
*H04W 72/0453* (2023.01)
*H04W 84/04* (2009.01)

(52) U.S. Cl.
CPC ....... *H04W 16/14* (2013.01); *H04W 72/0453* (2013.01); *H04W 84/042* (2013.01)

(58) Field of Classification Search
None
See application file for complete search history.

(56) References Cited

U.S. PATENT DOCUMENTS

2017/0164215 A1 6/2017 Chen et al.
2021/0029562 A1* 1/2021 Notargiacomo ...... H04W 12/06
2021/0168027 A1 6/2021 Parulkar et al.
2022/0417764 A1* 12/2022 Syed ..................... H04W 72/04
2023/0057469 A1* 2/2023 Hoole ................. H04L 41/0895
2023/0254702 A1* 8/2023 Damnjanovic ... H04W 28/0967 455/501

OTHER PUBLICATIONS

Giupponi, L., et al., "Blockchain-Enabled Network Sharing for O-RAN in 5G and Beyond", IEEE Network, vol. 36, No. 4, 2022, pp. 218-225.
Harutyunyan, D., et al., "Flex5G: Flexible Functional Split in 5G Networks", IEEE Transactions on Network and Service Management, vol. 15, No. 3, Sep. 1, 2018, pp. 961-975.
International Search Report received for PCT Patent Application No. PCT/US23/079231, mailed on Mar. 5, 2024, 4 pages.

(Continued)

*Primary Examiner* — Jenkey Van
(74) *Attorney, Agent, or Firm* — Jeremiah J. Baunach; Frontier IP Law PLLC

(57) ABSTRACT

Embodiments include systems and methods for sharing a cellular wireless telecommunication network radio unit (RU) by multiple different mobile network operators (MNOs). The system causes the functionality of the RU to be concurrently provided as a service to a plurality of different MNOs which may also use shared spectrum frequency bands. Thus, such a system enables the MNO to build and operate its cellular wireless telecommunication network without any radio hardware other than that provided by the RU, and without owning any hardware, radio spectrum and physical infrastructure.

11 Claims, 10 Drawing Sheets

(56) References Cited

OTHER PUBLICATIONS

Li, X., et al., "End-to-End Network Slicing in Radio Access Network, Transport Network and Core Network Domains", IEEE Access, vol. 8, Feb. 2020, pp. 29525-29537.
Nour, B., et al., "A Blockchain-Based Network Slice Broker for 5G Services", IEEE Networking Letters, vol. 1, No. 3, Sep. 2019, 4 pages.
Mehdi Alasti et al., "Providing Access On-Demand to Cellular Wireless Telecommunicaiton Network Functionality," U.S. Appl. No. 18/084,280, filed Dec. 19, 2022. (41 Pages).

* cited by examiner

SHARING A CELLULAR WIRELESS TELECOMMUNICATION NETWORK RADIO UNIT (RU) BY MULTIPLE MOBILE NETWORK OPERATORS

BRIEF SUMMARY

As the demand of enterprise organizations to build their own private Long-Term Evolution (LTE) or Fifth-Generation (5G) wireless networks increases, so does the demand for cost-effective and efficient techniques to do so. Use of shared spectrum frequency bands may be used to facilitate such cost-effective and efficient techniques, as they provide connectivity for network operators that would not otherwise have easy access to such frequency bands. For example, in the U.S., Citizens Broadband Radio Service (CBRS) is a band (band 48) of RF spectra from 3.5 GHz to 3.7 GHz for 3 types of users: 1. Incumbent users (e.g. the U.S. Navy) 2. Priority Access License (PAL) users (e.g. private organizations) and 3. General Authorized Access users (e.g. unlicensed users).

In one example embodiment, the systems and methods disclosed herein electronically offer as a service the functionality provided by a cellular wireless telecommunication network radio unit (RU) to multiple different mobile network operators (MNOs) that share such shared frequency bands. In addition to sharing the frequency bands, this enables MNOs to be able to concurrently share the functionality provided by the RU. For example, this may include making available on-demand usage of radio hardware of the RU to multiple different MNOs, including one or more amplifiers, filters, analog-to-digital (A/D) converters, wiring, antennas and base-station towers. The system may receive requests from a plurality of different MNOs to share the functionality provided by the RU. In response to receiving the requests, the system causes the functionality of the RU to be concurrently provided to the plurality of different mobile network operators. Thus, such a system enables the MNO to build and operate its respective cellular wireless telecommunication network without any radio hardware other than that provided by the RU, and without owning any hardware, radio spectrum and physical infrastructure.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
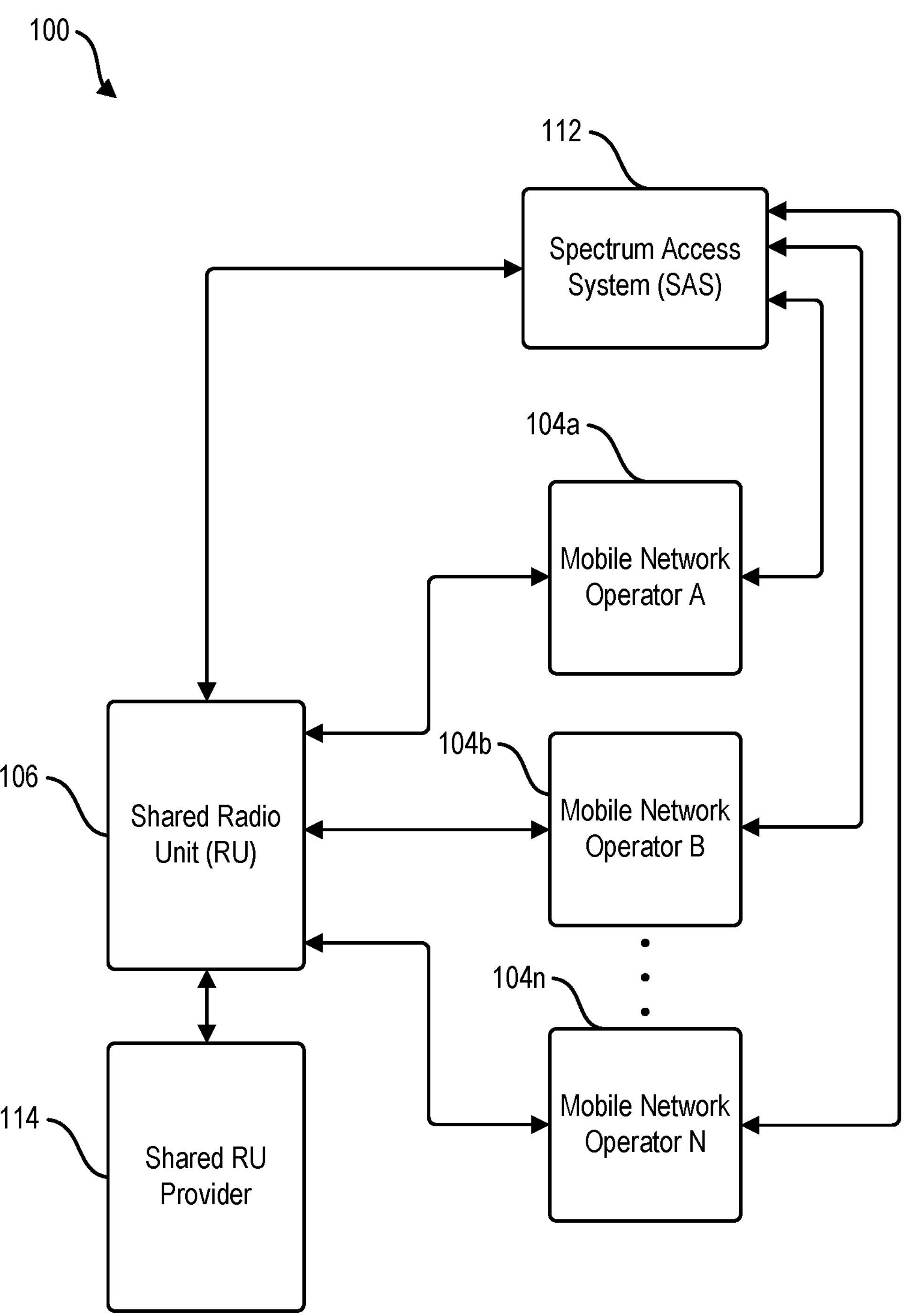
FIG. 1 illustrates an example system for sharing a cellular wireless telecommunication network RU by multiple MNOs in accordance with embodiments described herein.

FIG. 1 illustrates an example system 100 for sharing a cellular wireless telecommunication network RU by multiple MNOs in accordance with embodiments described herein.

Show is a shared RU 106 that is shared by a plurality of different mobile network operators (MNOs), for example, MNO A 104*a*, MNO B 104*b*, . . . MNO N 104*n* over one or more telecommunication connections. A shared RU provider operably coupled to and controlling the shared RU (e.g., another MNO that owns the shared RU 106) offers to multiple different MNOs, such as MNO A 104*a*, MNO B 104*b*, . . . MNO N 104*n* use of the shared RU 106, and the radio hardware, e.g., amplifiers, filters, A/D converters, wiring, antennas, and base-station towers associated with the shared RU 106.

In an example embodiment in which MNO A 104*a*, MNO B 104*b*, . . . MNO N 104*n* may be operating using CBRS spectrum, the shared RU 106 and each of the MNO A 104*a*, MNO B 104*b*, . . . MNO N 104*n* sharing the shared RU 106 are in operable communication (e.g., over the Internet) with the CBRS spectrum access system (SAS) to manage wireless communications for devices of MNO A 104*a*, MNO B 104*b*, . . . MNO N 104*n* transmitting in CBRS bands while sharing the shared RU 106, in order to prevent harmful interference to higher priority users transmitting in CBRS bands. However, in various other embodiments, the SAS 112 may provide such spectrum access management for other types of shared spectrums than CBRS.

Thus, such sharing of the shared RU as described herein facilitates enterprises, such as MNO A 104*a*, MNO B 104*b*, . . . MNO N 104*n*, to build their own private cellular wireless telecommunication networks without owning infrastructure, spectrum, radio hardware, etc., by following an "as-a-service" (aaS) model.

Figure 2:
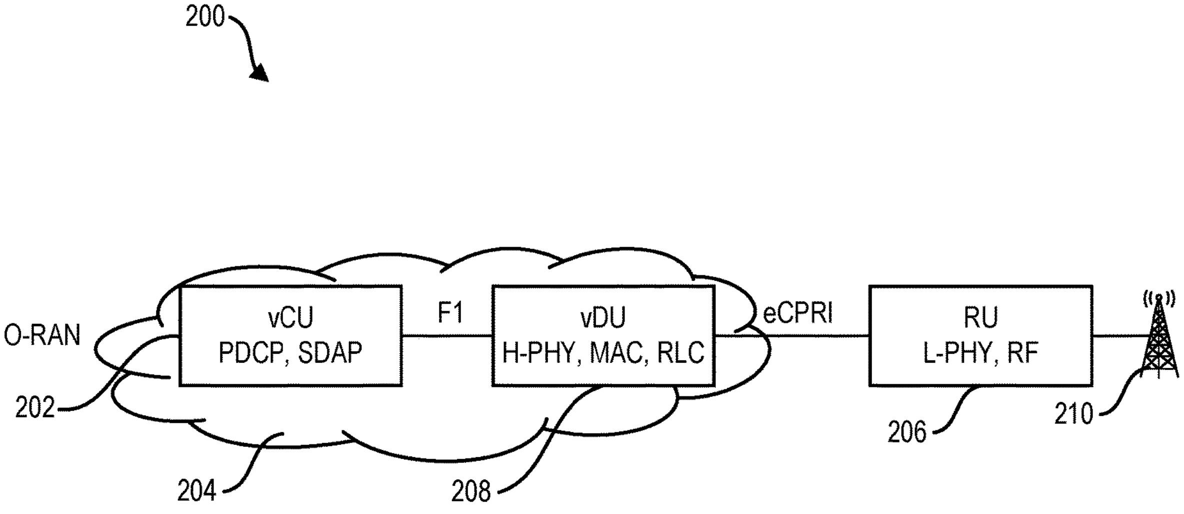
FIG. 2 illustrates an RU in a disaggregated open radio access network (RAN) architecture in accordance with embodiments described herein.

FIG. 2 illustrates an example RU 206 in a disaggregated open radio access network (RAN) architecture 200 in accordance with embodiments described herein.

For example, shared RU 106 of FIG. 1 may include functionality such as that of RU 206 and operate in a disaggregated open RAN environment, such as that of RU 206 shown FIG. 2. RU 206 is operably connected to radio tower 210 of a cellular wireless telecommunication network. RU 206 provides lower physical layer (L-PHY) and radio frequency (RF) functionality for the cellular wireless telecommunication network. For example, this may include amplifying, digitizing, transmitting and receiving the RF signals associated with radio tower 210 for the cellular wireless telecommunication network.

The distributed unit (DU), which may be virtualized in the cloud 204, such as (vDU 208) provides higher physical layer (H-PHY) layer, media access control (MAC) layer, and the radio link control (RLC) layer for the wireless telecommunication network. The vDU is connected to the RU 206 via an Enhanced Common Public Radio Interface (eCPRI) connection, which is an open interface (i.e., the end point can be from different vendors).

The centralized unit (CU), which may also be virtualized in the cloud 202, such as (vCU 202) provides Packet Data Convergence Protocol (PDCP) layer, Service Data Adaptation Protocol (SDAP), and radio resource controller (RRC) functionality for the wireless telecommunication network. The vCU is connected to the vDU 208 via the fifth generation (5G) New Radio (NR) 5G NR F1 interface, which is an open interface (i.e., the end point can be from different vendors).

Figure 3:
FIG. 3 is a chart illustrating different access tiers for the Citizens Broadband Radio Service (CBRS) shared frequency spectrum band.
Figure 3:
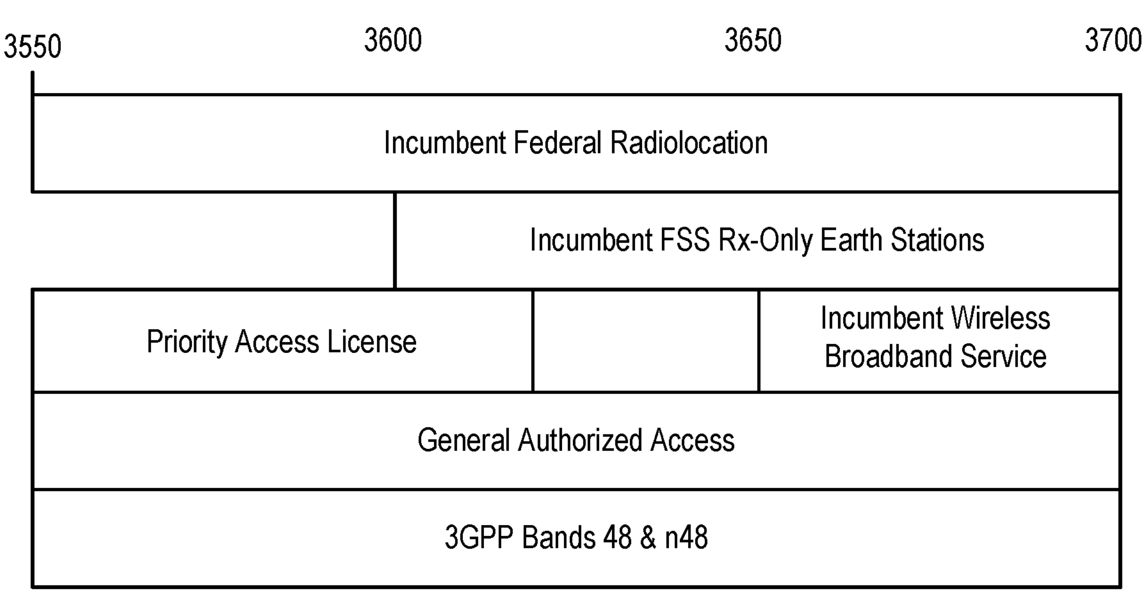

FIG. 3 is a chart 300 illustrating different access tiers for the Citizens Broadband Radio Service (CBRS) shared frequency spectrum band.

With reference to FIG. 3, in the U.S., CBRS is a band (band 48) of radio frequency spectra from 3.5 GHz to 3.7 GHz for 3 tiers of users: 1. Incumbent users (e.g. the U.S. Navy) 2. Priority Access License (PAL) users (e.g. private organizations) and 3. General Authorized Access (GAA) users (e.g. unlicensed users). Incumbent (Tier 1) users include US Navy radar systems who will always get first-priority use that operate in the 3550-3700 MHz band. To protect this space, there are a number of Coastal Exclusion Zones that surround nearly all of the US coastline. This is to ensure naval vessels can still communicate with shipyards without interference. There are also protection zones located inland that protect the airways around fixed satellite space to earth radars in the 3600-3650 MHz band. This portion of the spectrum is protected against interference from Priority Access License (Tier 2) users and General Authorized Access (Tier 3) users.

Tier 2 is for Priority Access License PAL users. PAL licenses are awarded to the highest bidders and allow coverage on a county-by-county basis in the U.S. A single PAL license covers a 10 megahertz channel within the 3550-3650 MHz band, and are assigned in 10 year renewable blocks. PALs must accept interference from Incumbent (Tier 1) users but are provided protection from interference from the General Authorized Access (Tier 3) users. A CBRS PAL provides the owner of the PAL the right to use a 10-megahertz channel block that will be assigned dynamically by a spectrum access system (e.g., SAS 112). The SAS assigns specific channels on a dynamic basis in order to accommodate other users and protect incumbents. PALs are governed by a "use it or share it" principal. If a PAL licensee is not using the spectrum channel block(s) that are available to them under the PAL, GAA users can operate in that spectrum.

Tier 3 is for General Authorized Access (GAA). These are unlicensed users who are last in line to use the spectrum across the 3550-3700 MHz band. While this tier is the most open, it has no expectation of protection from interference from any other tier, or other GAA users.

CBRS can be used for fourth generation (4G) LTE or for fixed or mobile 5G New Radio (NR). The system relies on a series of CBRS standards that were developed by the Wireless Innovation Forum (WInnForum) in conjunction with the Federal Communications Commission (FCC). These standards consist of security measures, licensing details, and what protocols are used to communicate with devices. Certification programs were developed to help establish standards for installing proper CBRS deployments that follow the proper guidelines in identifying itself, as well as communicating with the necessary FCC databases for operation.

The FCC requires the use of a SAS administrator to coordinate and manage operations of the three tiers of CBRS to prevent interference to higher priority users. In the present example embodiment, the SAS 112 of FIG. 1 operates as such a SAS administrator and is a frequency coordination system that manages the CBRS spectrum in the 3.5 GHz band. The SAS 112 manages spectrum sharing on a dynamic, as-needed basis across three tiers. In particular, The SAS 112 dynamically manages spectrum for all three tiers with first priority for incumbents, second priority for PALs and third priority for GAA users. The SAS 112 connects to FCC databases and incumbent reporting systems. In the present embodiment, PAL license owners and GAA users (represented by MNO A 104_a_, MNO B 104_b_, . . . MNO N 104_n_ in FIG. 1, and may also each be referred to herein simply as a "GAA" or a "PAL", as applicable) share the shared RU 106 to operate their respective wireless networks using the functionality of shared RU 106 to access and use the associated cell site and radio tower, thus enabling them to build their own private cellular wireless telecommunication networks without owning infrastructure, spectrum, radio hardware, etc., by following an aaS model.

Figure 4:
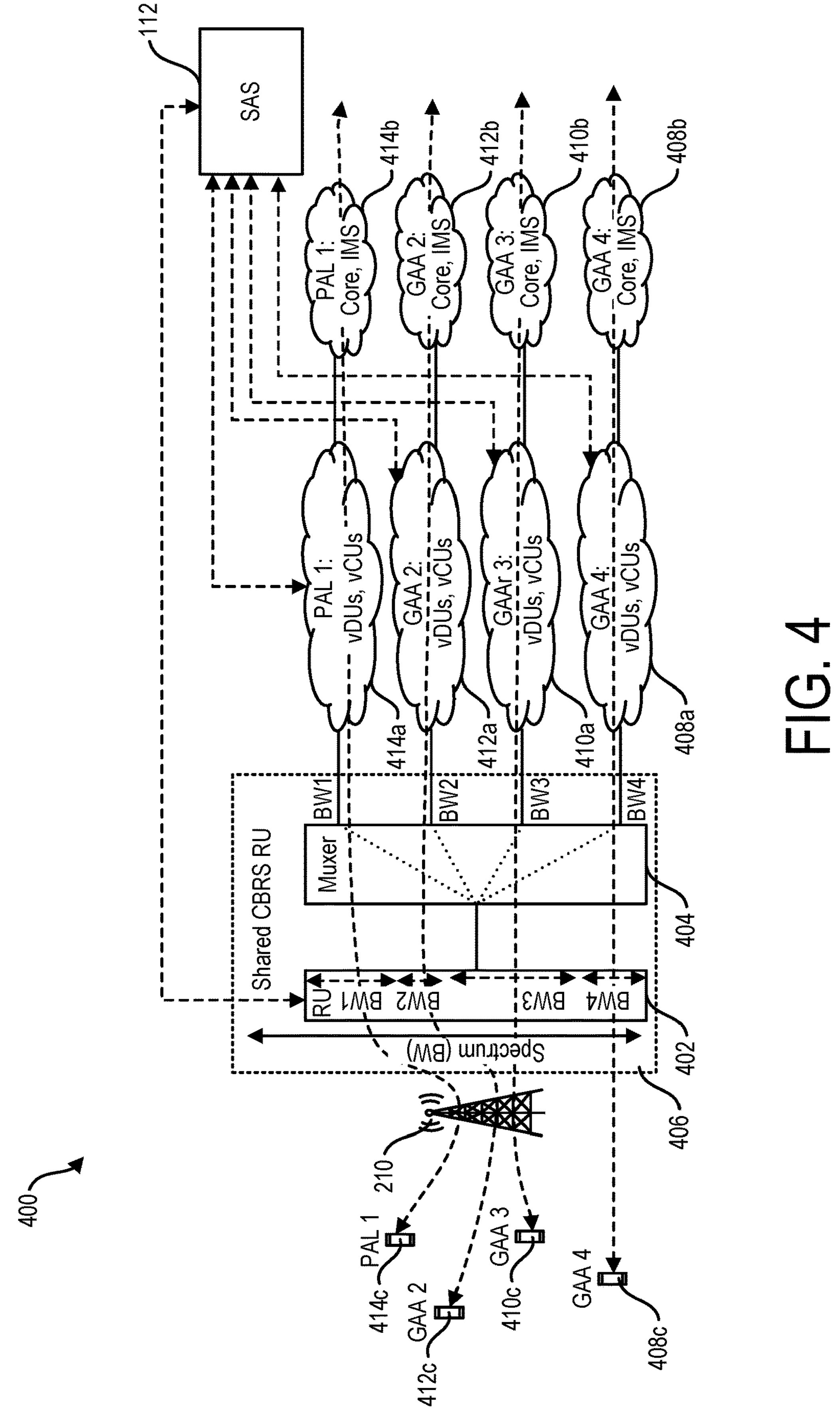
FIG. 4 illustrates system for sharing a cellular wireless telecommunication network RU including a shared CBRS RU in accordance with embodiments described herein.

FIG. 4 illustrates system 400 for sharing a cellular wireless telecommunication network RU including a shared CBRS RU 406 in accordance with embodiments described herein.

In an example embodiment, shared CBRS RU 406 is an example of a shared RU 106 shown in FIG. 1. A shared RU provider, such as shared RU 114 shown in FIG. 1, may offer use of the shared CBRS RU 406, and the radio hardware (e.g., amplifiers, filters, A/D converters, wiring, antennas, and base-station radio tower 210 that are part of or associated with the shared CBRS RU 406) to PALs (i.e., those MNOs that operate using a CBRS PAL), such a PAL 1, and to GAAs (i.e., those MNOs that operate using GAA), such as GAA 2, GAA 3 and GAA 4. In some embodiments, such functionality of the shared RU provider is integrated into the shared CBRS RU 406.

The PALs, such a PAL 1, and the GAAs, such as GAA 2, GAA 3 and GAA 4, have their own vDUs, vCUs, and virtualized 5G NR Core/Internet Protocol (IP) Multimedia Subsystem (IMS) network functions (NFs) operating in the cloud (which may be a private cloud or public cloud). Cloud computing is the on-demand availability of computer system resources, especially data storage and computing power, without direct active management by the user. Large clouds often have functions distributed over multiple locations, each of which is a data center. In particular, the present example of FIG. 4 shows: PAL 1 vDUs and vCUs operating in private or public cloud 414_a_; PAL 1 Core and IMS NFs operating in private or public cloud 414_b_; GAA 2 vDUs and vCUs operating in private or public cloud 412_a_; GAA 2 Core and IMS NFs operating in private or public cloud 412_b_; GAA 3 vDUs and vCUs operating in private or public cloud 410_a_; GAA 3 Core and IMS NFs operating in private or public cloud 410_b_; GAA 4 vDUs and vCUs operating in private or public cloud 408_a_; and GAA 4 Core and IMS NFs operating in private or public cloud 408_b_. In order to prevent harmful interference to higher priority users transmitting in CBRS bands, RU 402, PAL 1 vDUs and vCUs operating in private or public cloud 414_a_, GAA 2 vDUs and vCUs operating in private or public cloud 412_a_, GAA 3 vDUs and vCUs operating in private or public cloud 410_a_ and GAA 4 vDUs and vCUs operating in private or public cloud 408_a_ each communicate with the SAS 112 to manage wireless communications of devices transmitting in CBRS bands while sharing the RU 402 using RF spectrum under the respective PAL or GAA.

Various network connections (e.g., Internet connections) and applicable logical telecommunication network interfaces connect: PAL 1 vDUs and vCUs operating in private or public cloud 414_a_ to PAL 1 Core and IMS NFs operating in private or public cloud 414_b_; GAA 2 vDUs and vCUs operating in private or public cloud 412_a_ to GAA 2 Core and IMS NFs operating in private or public cloud 412_b_; GAA 3 vDUs and vCUs operating in private or public cloud 410_a_ to GAA 3 Core and IMS NFs operating in private or public cloud 410_b_; and GAA 4 vDUs and vCUs operating in private or public cloud 408_a_ to GAA 4 Core and IMS NFs operating in private or public cloud 408_b_. In various example embodiments, some or all of the public or private clouds of FIG. 4 may be combined into one or more clouds hosted by hardware computing devices located in one or more data centers.

Various network connections (e.g., Internet connections) and applicable logical telecommunication network interfaces (e.g., individual eCPRI interfaces) connect: PAL 1 vDUs operating in private or public cloud 414_a_ to the multiplexer (muxer) 404 of shared CBRS RU 406; GAA 2 vDUs operating in private or public cloud 412_a_ to the multiplexer 404 of shared CBRS RU 406; GAA 3 vDUs operating in private or public cloud 410_a_ to the multiplexer 404 of shared CBRS RU 406; and GAA 4 vDUs operating in private or public cloud 408_a_ to the multiplexer 404 of shared CBRS RU 406. The muxer 404 is operably coupled to the RU 402 of shared CBRS RU 406 in a manner that enables several input signals comprising cellular wireless telecommunication network traffic of PALs and GAAs to be able to share functionality provided by the RU 402.

In an example embodiment, the shared CBRS RU 406 electronically apportions a spectrum made available by the RU 402 for cellular wireless telecommunication into a plurality of bandwidth portions (e.g., BW 1, BW 2, BW 3, and BW 4 as shown in FIG. 4). Such bandwidth portions are apportioned for use by the PALs, such a PAL 1, and the GAAs, such as GAA 2, GAA 3 and GAA 4. In the example shown in FIG. 4, BW 1 is apportioned for use by PAL 1, BW 2 is apportioned for use by GAA 2, BW 3 is apportioned for use by GAA 3 and BW 4 is apportioned for use by GAA 4.

For each of the PALs, such a PAL 1, and the GAAs, such as GAA 2, GAA 3 and GAA 4, the RU 402 receives cellular wireless telecommunication network traffic between user equipment (UE) to which the PAL or GAA provides cellular wireless telecommunication service and other devices (e.g., UE 414_c_ for PAL 1, UE 412_c_ for GAA 2, UE 410_c_ for GAA 3 and UE 408_c_ for GAA 4). The shared CBRS RU 406 causes RU 402 to use a respective bandwidth portion apportioned by the shared CBRS RU 406 to the particular PAL or GAA sharing the RU 402 in order to send the cellular wireless telecommunication network traffic between the UE on the network of the particular PAL or GAA and another device. For example, shared CBRS RU 406 causes the RU 402 to use BW 1 apportioned to PAL 1 to send the cellular wireless telecommunication network traffic between UE 414_c_ and other devices.

In various different embodiments, the CBRS RU 406 may cover, or the shared RU provider 114 of FIG. 1 may cause the shared CBRS RU 406 to cover, only a part of the CBRS spectrum or all of the CBRS spectrum. Some examples of such different coverage include: "3650" MHz to "3700" MHz for GAAs only; "3550" MHz to "3700" MHz for GAAs only; and "3550" MHz to "3700" MHz for PALs and GAAs.

The PALs, such a PAL 1, and the GAAs, such as GAA 2, GAA 3 and GAA 4 instantiated their NFs in the cloud (as-a-service) and connected their vDUs to the shared CBRS RU 506. The shared CBRS RU 506 knows the spectrum and the bandwidth allocated to each PAL and GAA. Each PAL and GAA, such as PAL 1, GAA 2, GAA 3 and GAA 4, may also each be referred to as a different CBRS Device (CBSD) due to using a respective bandwidth portion made available by the shared CBRS RU 506 apportioned to the respective PAL or GAA to send the cellular wireless telecommunication network traffic to and from a UE to which the PAL or GAA provides cellular wireless telecommunication service. The PALs and the GAAs do not have any radio hardware, as the shared CBRS RU 506 provides that as a service. Thus, the shared CBRS RU 406 facilitates enterprises using such PALs and GAAs to build their own private networks without owning infrastructure, spectrum, radio hardware, etc., by following an "aaS" model.

In an example embodiment, the time-division duplexing (TDD) alignment between the PALs and the GAAs, such as PAL 1, GAA 2, GAA 3 and GAA 4, is provided by the shared CBRS RU 406. The CBSDs (i.e., the PALs and GAAs) may use the same timing, frequency and phase provided by shared CBRS RU 406. PAL 1, GAA 2, GAA 3 and GAA 4 may use the same TDD downlink/uplink (DL/UL) frame structure and DL/UL ratio. The shared CBRS RU 406 may be responsible for synchronization with the PALs and GAAs outside of the shared CBRS RU 406 framework. In an example embodiment, shared CBRS RU 406 communicates with SAS 112 to obtain the spectrum and the bandwidth allocated to each of the CBSDs (i.e., the PALs and GAAs). Also, in an example embodiment, carrier aggregation (CA) or dual connectivity (DC) is supported by the CBSD (i.e., by the PAL or GAA) completely transparent to the shared CBRS RU 406 or the shared CBRS RU provider 114 of FIG. 1.

Furthermore, due to orthogonality of DL/UL signals, the shared CBRS RU 406 may in various embodiments create lower interference or no interference between the CBSDs (i.e., the PALs and GAAs) connected to it. The coexistence of CBSDs (i.e., the PALs and GAAs) is managed by the SAS 112 and is transparent to the shared CBRS RU 406.

Figure 5:
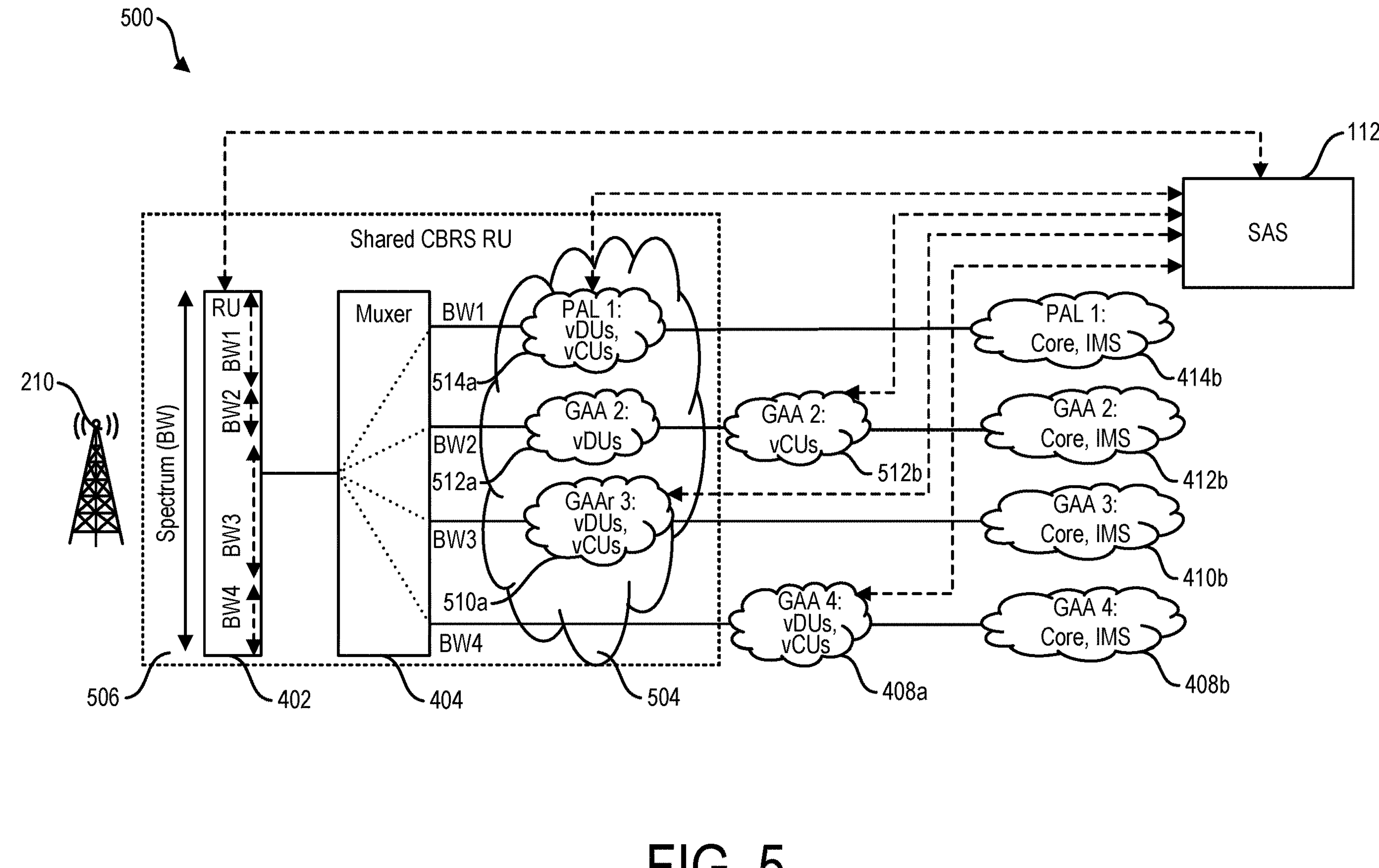
FIG. 5 illustrates a system for sharing a shared CBRS RU with hardware at a cellular (cell) site of the shared CBRS RU providing a local cloud for instantiating respective virtual centralized units (vCUs) and respective virtual distributed unit (vDUs) of multiple different MNOs in accordance with embodiments described herein.

FIG. 5 illustrates a system 500 for sharing a shared CBRS RU 506 with computing hardware at a cellular (cell) site of the shared CBRS RU providing a local cloud for instantiating respective virtual centralized units (vCUs) and respective virtual distributed unit (vDUs) of multiple different MNOs in accordance with embodiments described herein.

In the example embodiment of FIG. 5, the CBRS RU 506, or a shared RU provider, such as shared RU provider 114 shown in FIG. 1, may cause CBRS RU 506 to offer cloud computing as a service provided by hardware at a cell site of the CBRS RU 506 for PALs and GAAs to be able to instantiate respective vCUs and respective vDUs of the GAAs and PALs on a local cloud at the cell site, while also causing the functionality of the RU 402 to be concurrently provided to the GAAs and PALs.

For example, as shown in FIG. 5, the vDUs and vCUs of GAA 3 are instantiated on local cloud 510*a* hosted by computing resources hardware at the cell site associated with RU 402. The vDUs of GAA 2 are instantiated on local cloud 512*a* also provided by computing resources hardware at the cell site associated with RU 402. The vDUs and vCUs of PAL 1 are instantiated on a local cloud 514*a* provided by computing resources hardware also located at the cell site associated with RU 402. In an example embodiment, the PALs and GAAs may select which NFs to have instantiated on a local cloud provided by computing resources hardware located at the cell site associated with RU 402.

Figure 6:
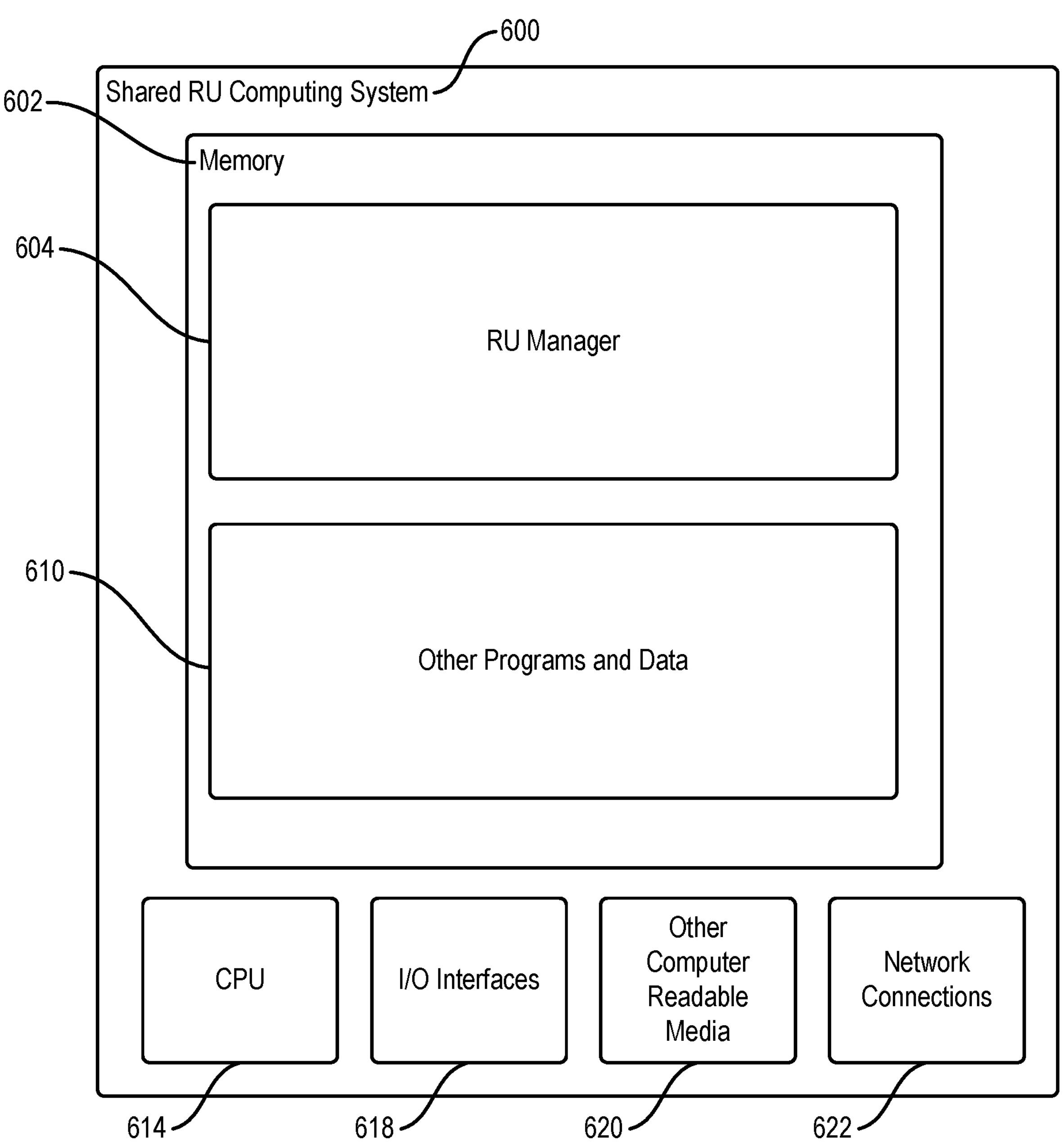
FIG. 6 shows a system diagram that illustrates an example of a shared RU computing system for implementing shared RU, in accordance with embodiments described herein.

FIG. 6 shows a system diagram that illustrates an example of a shared RU computing system 600 for implementing shared RU, such as, for example, shared RU 106 of FIG. 1, shared CBRS RU 406 of FIG. 4 and/or shared CBRS RU 506 of FIG. 5, in accordance with embodiments described herein.

In various embodiments, the control systems of the shared RU 106 of FIG. 1, shared CBRS RU 406 of FIG. 4 and/or shared CBRS RU 506 of FIG. 5 can be implemented either as a network elements on dedicated hardware, as a software instance running on dedicated hardware, or as a virtualized function instantiated on an appropriate platform, e.g., a cloud infrastructure. In some embodiments, many operations and functionality of such systems may be completely software-based and designed as cloud-native, meaning that they're agnostic to the underlying cloud infrastructure, allowing higher deployment agility and flexibility. However, FIG. 13 illustrates an example of underlying hardware on which systems of a shared RU, such as, for example, shared RU 106 of FIG. 1, shared CBRS RU 406 of FIG. 4 and/or shared CBRS RU 506 of FIG. 5, may be implemented. For example, systems of the shared RU 106 may be implemented using wireless shared RU computing system 600. In some embodiments, one or more special-purpose computing systems may be used to implement systems of the shared RU 106. Accordingly, various embodiments described herein may be implemented in software, hardware, firmware, or in some combination thereof. shared RU computing system 600 may include memory 602, one or more central processing units (CPUs) 614, I/O interfaces 418, other computer-readable media 420, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon access RU manager 604. The RU manager 604 is configured to implement and/or perform various control functions to implement operations of the shared RU 106 and/or shared RU provider 114 described herein. Memory 602 may also store other programs and data 610, which may include control systems for L-PHY and RF functionality for the cellular wireless telecommunication network, control systems for amplifying, digitizing, transmitting and receiving the RF signals associated with radio tower 210 for the cellular wireless telecommunication network, performance statistics, network interference management and statistics, quality of service management and statistics, throughput statistics, databases, user interfaces, operating systems, other network management functions, other NFs, etc.

Network connections 622 are configured to communicate with other computing devices, telecommunication equipment, computer network equipment and/or radio antennas, to perform operations of the shared RU. In various embodiments, the network connections 622 may include transmitters and receivers to send and receive data as described herein; hardware that implements systems for L-PHY and RF functionality for the cellular wireless telecommunication network; hardware that implements systems for amplifying, digitizing, transmitting and receiving the RF signals associated with radio tower 210 for the cellular wireless telecommunication network; radio hardware including one or more amplifiers, filters, analog-to-digital (A/D) converters, wiring, antennas and base-station towers and/or interfaces thereto; etc.

I/O interfaces 618 may include video interfaces, other data input or output interfaces, or the like. In some embodiments, I/O interfaces 618 may include transmitters and receivers to send and receive data as described herein; hardware that implements systems for L-PHY and RF functionality for the cellular wireless telecommunication network; hardware that implements systems for amplifying, digitizing, transmitting and receiving the RF signals associated with radio tower 210 for the cellular wireless telecommunication network; radio hardware including one or more amplifiers, filters, analog-to-digital (A/D) converters, wiring, antennas and base-station towers and/or interfaces thereto; etc.

Other computer-readable media 620 may include other types of stationary or removable computer-readable media, such as removable flash drives, external hard drives, or the like.

In some embodiments, one or more special-purpose computing systems may be used to implement systems of the RU manager 604. Accordingly, various embodiments described herein may be implemented in software, hardware, firmware, or in some combination thereof.

Figure 7:
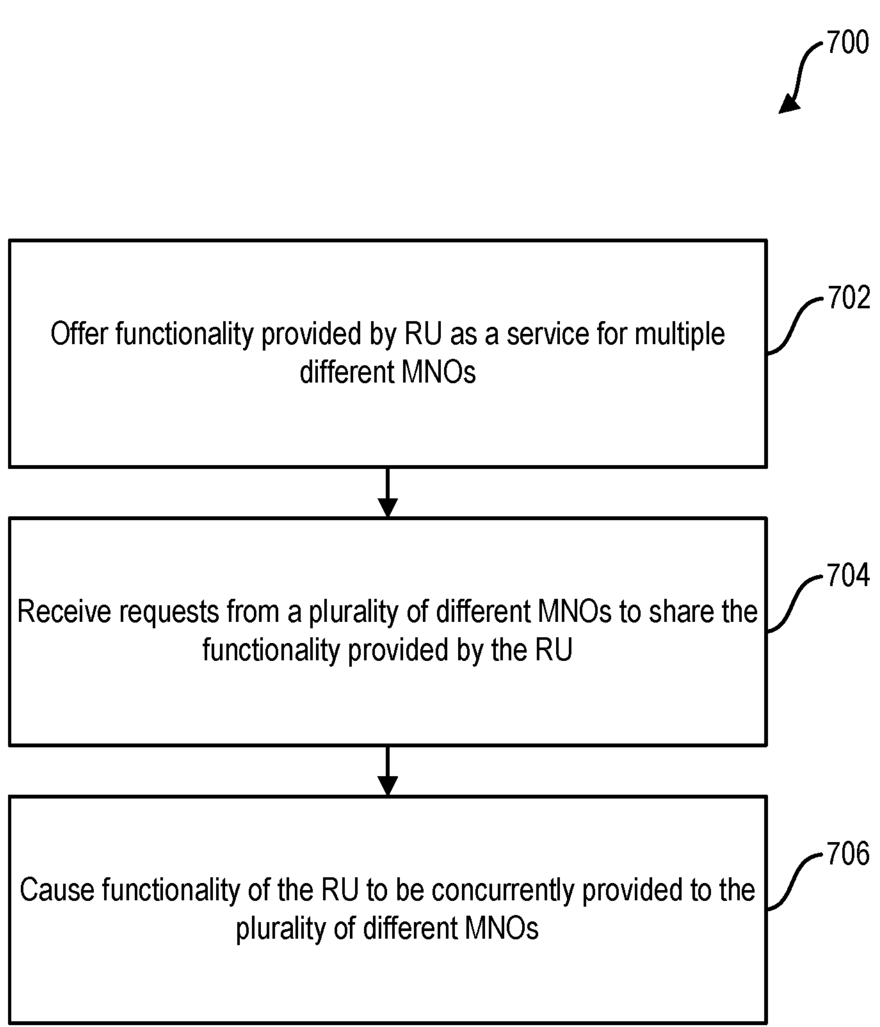
FIG. 7 illustrates a logical flow diagram showing an example of a process for sharing a cellular wireless telecommunication network RU by multiple MNOs in accordance with embodiments described herein.

FIG. 7 illustrates a logical flow diagram 700 showing an example of a process for sharing a cellular wireless telecommunication network RU by multiple MNOs in accordance with embodiments described herein.

At 702, the system 100 electronically offers functionality provided by a cellular wireless telecommunication network radio unit (RU) as a service for multiple different mobile network operators to be able to concurrently share the functionality provided by the RU. This may include offering, and making available on-demand usage of, radio hardware of the RU to multiple different mobile network operators, including one or more amplifiers, filters, analog-to-digital (A/D) converters, wiring, antennas and base-station towers.

At 704, the system 100 receives requests from a plurality of different mobile network operators to share the functionality provided by the RU.

At 706, the system 100, in response to receiving the requests, causes the functionality of the RU to be concurrently provided to the plurality of different mobile network operators. For example, this may include making available on-demand usage of radio hardware of the RU to multiple different mobile network operators, including one or more amplifiers, filters, analog-to-digital (A/D) converters, wiring, antennas and base-station towers.

Figure 8:
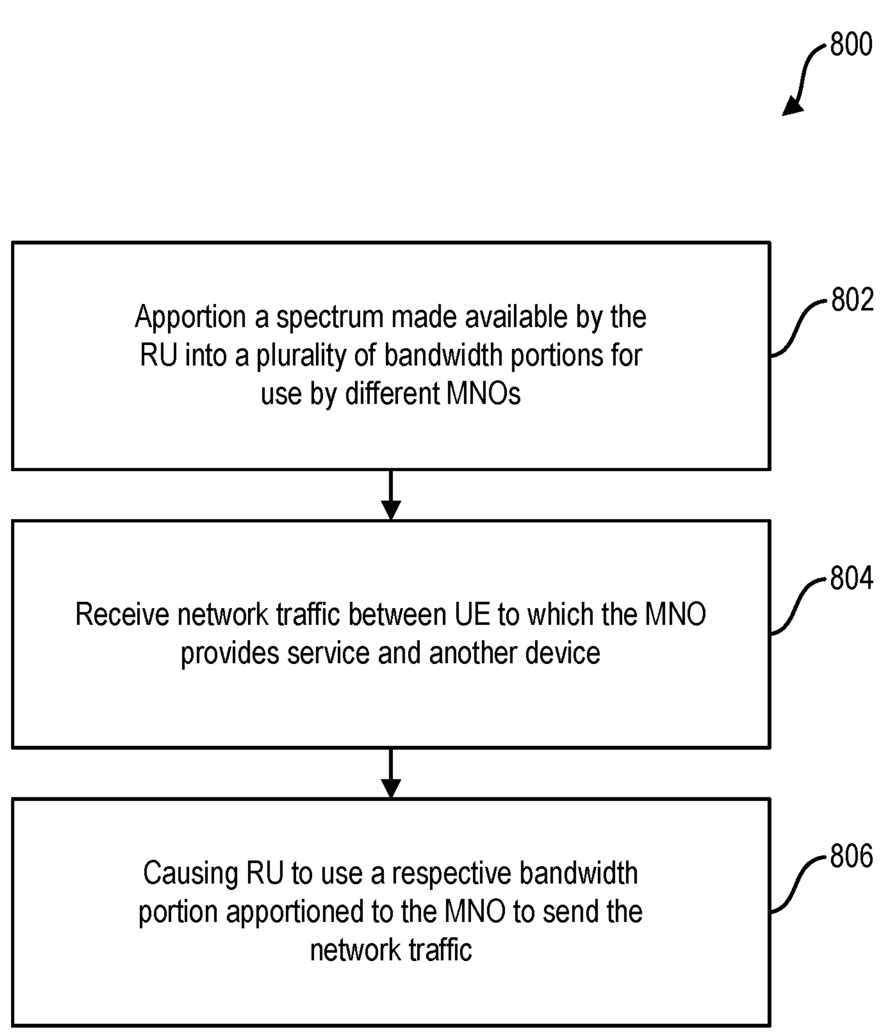
FIG. 8 illustrates a logical flow diagram showing an example of a process, useful in the process of FIG. 7, for causing the functionality of the RU to be concurrently provided to the plurality of different mobile network operators in accordance with embodiments described herein.

FIG. 8 illustrates a logical flow diagram showing an example of a process 800, useful in the process 700 of FIG. 7, for causing the functionality of the RU to be concurrently provided to the plurality of different mobile network operators in accordance with embodiments described herein.

At 802, the system 100 electronically apportions a spectrum made available by the RU for cellular wireless telecommunication into a plurality of bandwidth portions for use by the plurality of different mobile network operators (MNOs). In an example embodiment, each MNO of the plurality of MNOs operates under a Citizens Broadband Radio Service (CBRS) Priority Access License (PAL) or under or under CBRS General Authorized Access (GAA) and operates on the respective bandwidth portion of the MNO using radio frequency (RF) spectrum under the PAL or GAA.

At 804, for each mobile network operator (MNO) of the plurality of MNOs, the RU receives cellular wireless telecommunication network traffic between user equipment (UE) to which the MNO provides cellular wireless telecommunication service and another device. Each MNO of the plurality of MNOs may operate as a different Citizens Broadband Radio Service Device (CBSD) of a plurality of CBSDs due to using the respective bandwidth portion made available by the RU apportioned to the MNO to send the cellular wireless telecommunication network traffic between the UE to which the MNO provides cellular wireless telecommunication service and another device.

At 806, for each mobile network operator (MNO) of the plurality of MNOs, the system 100 causes the RU to use a respective bandwidth portion apportioned to the MNO of the plurality of bandwidth portions to send the cellular wireless telecommunication network traffic between the UE and the other device.

The system 100 may cause the RU to operably communicate with a Spectrum Access System (SAS) of the Citizens Broadband Radio Service to manage wireless communications of devices transmitting in CBRS bands of the plurality of CBSDs operating on the respective bandwidth portions while sharing the RU using RF spectrum under the PAL or GAA, in order to prevent harmful interference to higher priority users transmitting in CBRS bands. Causing the RU to operably communicate with the SAS may include causing the RU to operably communicate with the SAS to obtain spectrum and bandwidth allocated to each CBSD of the plurality of CBSDs under CBRS.

In an example embodiment, for each CBSD of the plurality of CBSDs, one or more of a respective virtual centralized unit (vCU) and a respective virtual distributed unit (vDU) of the CBSD communicates with the SAS to manage wireless communications of devices transmitting in a CBRS bands of the CBSD while sharing the RU using RF spectrum under the PAL or GAA. This is in order to prevent harmful interference to higher priority users transmitting in CBRS bands. Also, for each CBSD of the plurality of CBSDs, one or more of a respective virtual centralized unit (vCU) and a respective virtual distributed unit (vDU) of the CBSD may communicate with the SAS to manage wireless communications of devices transmitting in a CBRS bands of the CBSD while sharing the RU using RF spectrum under the PAL or GAA, in order to prevent harmful interference to higher priority users transmitting in CBRS bands.

In an example embodiment, each CBSD of the plurality of CBSDs, to which functionality of the RU is concurrently provided, use the RU to operate a respective cellular wireless telecommunication network having a disaggregated radio access network (RAN) architecture according to O-RAN ALLIANCE Fronthaul Split Option 7-2x.

In an example embodiment, the system may also cause the RU to cover an entire available spectrum of the CBRS for use under one or more of the PAL and GAA for each CBSD of the plurality of CBSDs. In another embodiment, the system 100 may cause the RU to cover only a part of an entire available spectrum of the CBRS for use under one or more of the PAL and GAA for each CBSD of the plurality of CBSDs.

The system 100 may also electronically offer cloud computing services as a service provided by hardware at a cellular (cell) site of the RU for the for multiple different MNOs to be able to instantiate respective virtual centralized units (vCUs) and respective virtual distributed unit (vDUs) of the multiple different mobile network operators on a local cloud at the cell site while also causing the functionality of the RU to be concurrently provided to the plurality of different MNOs.

Figure 9:
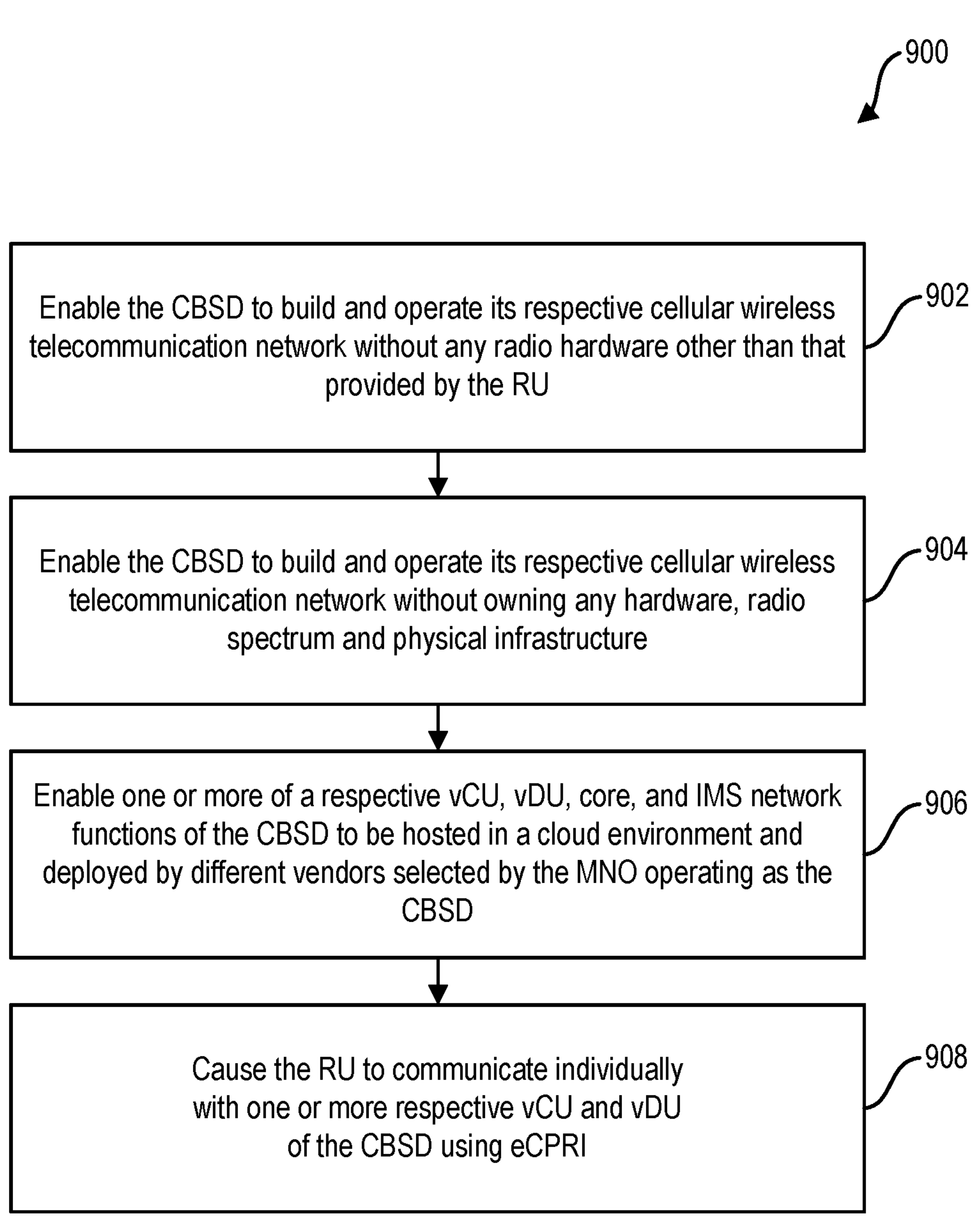
FIG. 9 illustrates a logical flow diagram showing an example of a process for sharing a CBRS RU by multiple MNOs in accordance with embodiments described herein.

FIG. 9 illustrates a logical flow diagram showing an example of a process for sharing a CBRS RU by multiple MNOs in accordance with embodiments described herein.

At 902, the system 100 electronically enables a CBSD to build and operate its respective cellular wireless telecommunication network without any radio hardware other than that provided by the RU, in which functionality of the RU is concurrently provided to a plurality of different CBSDs that are each associated with a different MNO.

At 904, the system 100 electronically enables the CBSD to build and operate its respective cellular wireless telecommunication network without owning any hardware, radio spectrum and physical infrastructure.

At 906, the system 100 electronically enables one or more of a respective vCU, vDU, core, and Internet Protocol (IP) Multimedia Subsystem (IMS) network functions of the CBSD to be hosted in a cloud environment and deployed by different vendors selected by the MNO operating as the CBSD.

At 908, the system 100 causes the RU to communicate individually with the one or more respective vCU and vDU using Enhanced Common Public Radio Interface (eCPRI).

Figure 10:
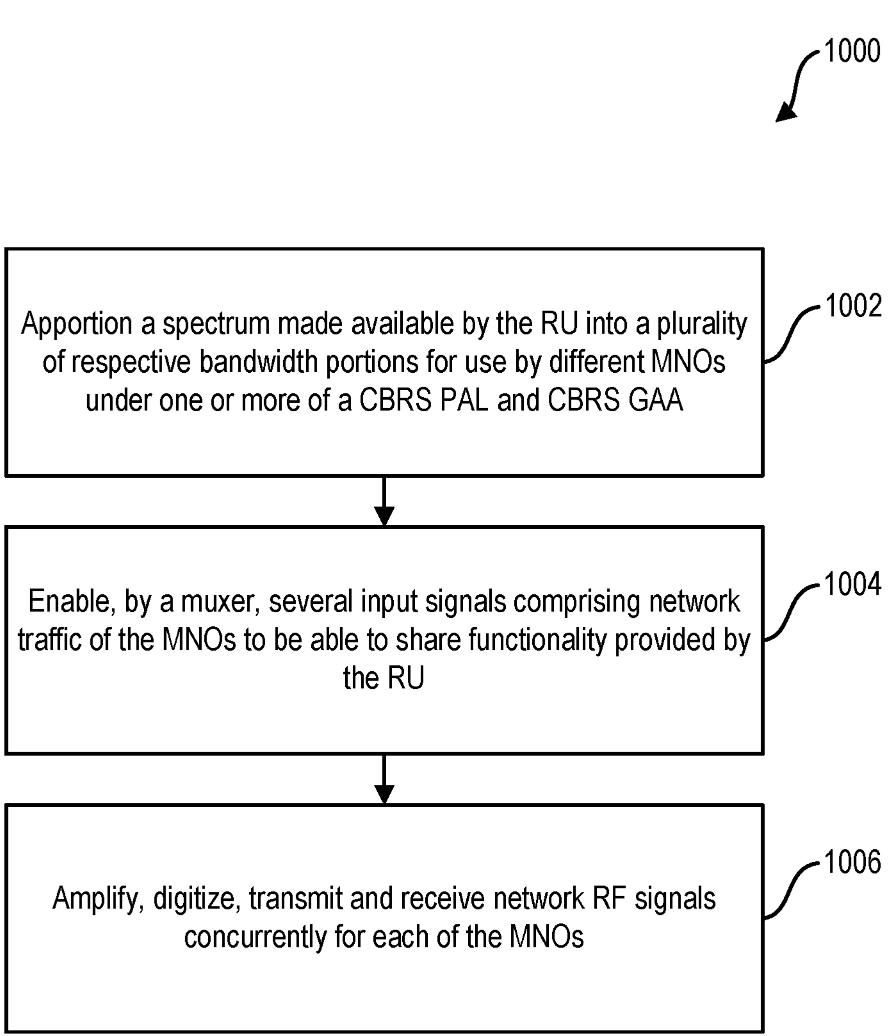
FIG. 10 illustrates a logical flow diagram showing an example of a process for sharing a CBRS RU by multiple MNOs including apportion a spectrum made available by the RU in accordance with embodiments described herein.

FIG. 10 illustrates a logical flow diagram showing an example of a process 1000 for sharing a CBRS RU by multiple MNOs including apportion a spectrum made available by the RU in accordance with embodiments described herein.

At 1002, a cellular wireless telecommunication network radio unit (RU) apportions a spectrum made available by the RU for cellular wireless telecommunication into a plurality of respective bandwidth portions for use by a plurality of different mobile network operators under one or more of a CBRS Priority Access License (PAL) and CBRS General Authorized Access (GAA) of each mobile network operator (MNO) of the plurality of different MNOs.

At 1004, a multiplexer (muxer) coupled to the RU enables several input signals comprising cellular wireless telecommunication network traffic of the plurality of different MNOs to be able to share functionality provided by the RU.

At 1006, the RU amplifies, digitizes, transmits and receives cellular wireless telecommunication network radio frequency (RF) signals concurrently for each mobile MNO of the plurality of different MNOs operating under CBRS.

In an example embodiment, wherein the RU comprises one or more amplifiers, filters, analog-to-digital (A/D) converters and wiring. The RU may also comprise one or more hardware interfaces to one or more antennas and to a base-station tower. The RU makes available to the plurality of different MNOs on-demand usage of the one or more amplifiers, filters, analog-to-digital (A/D) converters, and wiring, and to the one or more antennas and base-station tower.

Each MNO of the plurality of different MNOs may operate as a different CBRS Device (CBSD) of a plurality of CBSDs due to using a respective bandwidth portion made available by the RU apportioned to the MNO to send the cellular wireless telecommunication network traffic between a UE to which the MNO provides cellular wireless telecommunication service and another device.

In an example embodiment, the RU may further include one or more amplifiers, filters, analog-to-digital (A/D) converters and wiring. The RU may also include cloud computing hardware at a cellular site of the RU that enables the multiple different mobile network operators to be able to instantiate respective virtual centralized units (vCUs) and respective virtual distributed units (vDUs) of the plurality of different MNOs on a local cloud at the cell site while also causing functionality of the RU to be shared between the plurality of different mobile network operators.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:

a memory that stores computer-executable instructions; and at least one processor that executes the computer-executable instructions to perform actions, the actions including:

electronically offering functionality provided by a cellular wireless telecommunication network radio unit (RU) as a service for multiple different mobile network operators to be able to concurrently share the functionality provided by the RU;

receiving requests from a plurality of different mobile network operators to share the functionality provided by the RU; and in response to receiving the requests, causing the functionality of the RU to be concurrently provided to the plurality of different mobile network operators, wherein the causing the functionality of the RU to be concurrently provided to the plurality of different mobile network operators includes:

electronically apportioning a spectrum made available by the RU for cellular wireless telecommunication into a plurality of bandwidth portions for use by the plurality of different mobile network operators; and for each mobile network operator (MNO) of the plurality of MNOs:

receiving by the RU, cellular wireless telecommunication network traffic between user equipment (UE) to which the MNO provides cellular wireless telecommunication service and another device; and causing the RU to use a respective bandwidth portion apportioned to the MNO of the plurality of bandwidth portions to send the cellular wireless telecommunication network traffic between the UE and the other device, wherein each MNO of the plurality of MNOs operates under a Citizens Broadband Radio Service (CBRS) Priority Access License (PAL) or under CBRS General Authorized Access (GAA) and operates on the respective bandwidth portion of the MNO using radio frequency (RF) spectrum under the PAL or GAA and each MNO of the plurality of MNOs operates as a different Citizens Broadband Radio Service Device (CBSD) of a plurality of CBSDs due to using the respective bandwidth portion made available by the RU apportioned to the MNO to send the cellular wireless telecommunication network traffic between the UE to which the MNO provides cellular wireless telecommunication service and another device.

2. The system of claim 1 wherein the actions further include:

causing the RU to operably communicate with a Spectrum Access System (SAS) of the Citizens Broadband Radio Service to manage wireless communications of devices transmitting in CBRS bands of the plurality of CBSDs operating on the respective bandwidth portions while sharing the RU using RF spectrum under the PAL or GAA, in order to prevent harmful interference to higher priority users transmitting in CBRS bands.

3. The system of claim 2 wherein, for each CBSD of the plurality of CBSDs, one or more of a respective virtual centralized unit (vCU) and a respective virtual distributed unit (vDU) of the CBSD communicates with the SAS to manage wireless communications of devices transmitting in a CBRS bands of the CBSD while sharing the RU using RF spectrum under the PAL or GAA, in order to prevent harmful interference to higher priority users transmitting in CBRS bands.

4. The system of claim 2 wherein each CBSD of the plurality of CBSDs, to which functionality of the RU is concurrently provided, use the RU to operate a respective cellular wireless telecommunication network having a disaggregated radio access network (RAN) architecture according to O-RAN ALLIANCE Fronthaul Split Option 7-2x.

5. The system of claim 4 wherein the actions further include:

for each CBSD of the plurality of CBSDs, to which functionality of the RU is concurrently provided:

electronically enabling the CBSD to build and operate its respective cellular wireless telecommunication network without any radio hardware other than that provided by the RU;

electronically enabling the CBSD to build and operate its respective cellular wireless telecommunication network without owning any hardware, radio spectrum and physical infrastructure;

electronically enabling one or more of a respective vCU, vDU, core, and Internet Protocol (IP) Multimedia Subsystem (IMS) network functions of the CBSD to be hosted in a cloud environment and deployed by different vendors selected by the MNO operating as the CBSD; and causing the RU to communicate individually with the one or more respective vDU using Enhanced Common Public Radio Interface (eCPRI).

6. The system of claim 2 wherein causing the RU to operably communicate with the SAS includes causing the RU to operably communicate with the SAS to obtain spectrum and bandwidth allocated to each CBSD of the plurality of CBSDs under CBRS.

7. The system of claim 1, wherein the operations further include:

causing the RU to cover an entire available spectrum of the CBRS for use under one or more of the PAL and GAA for each CBSD of the plurality of CBSDs.

8. The system of claim 7, wherein the operations further include:

causing the RU to cover only a part of an entire available spectrum of the CBRS for use under one or more of the PAL and GAA for each CBSD of the plurality of CBSDs.

9. The system of claim 7, wherein the operations further include:

electronically offering cloud computing services as a service provided by hardware at a cellular (cell) site of the RU for the for multiple different MNOs to be able to instantiate one or more of: respective virtual distributed units (vDUs) and respective virtual centralized units (vCUs) of the multiple different mobile network operators on a local cloud at the cell site while also causing the functionality of the RU to be concurrently provided to the plurality of different MNOs.

10. The system of claim 1 wherein the offering functionality provided by the RU as a service for multiple different mobile network operators includes offering, and making available on-demand usage of, radio hardware of the RU to multiple different mobile network operators, including one or more amplifiers, filters, analog-to-digital (A/D) converters, wiring, antennas and base-station towers.

11. A method comprising:

electronically offering functionality provided by a cellular wireless telecommunication network radio unit (RU) as a service for multiple different mobile network operators to be able to concurrently share the functionality provided by the RU;

receiving requests from a plurality of different mobile network operators to share the functionality provided by the RU; and in response to receiving the requests, causing the functionality of the RU to be concurrently provided to the plurality of different mobile network operators, wherein the causing the functionality of the RU to be concurrently provided to the plurality of different mobile network operators includes:

electronically apportioning a spectrum made available by the RU for cellular wireless telecommunication into a plurality of bandwidth portions for use by the plurality of different mobile network operators; and for each mobile network operator (MNO) of the plurality of MNOS:

receiving by the RU cellular wireless telecommunication network traffic between user equipment (UE) to which the MNO provides cellular wireless telecommunication service and another device, and causing the RU to use a respective bandwidth portion apportioned to the MNO of the plurality of bandwidth portions to send the cellular wireless telecommunication network traffic between the UE and the other device, wherein each MNO of the plurality of MNOs operates under a Citizens Broadband Radio Service (CBRS) Priority Access License (PAL) or under or under CBRS General Authorized Access (GAA) and operates on the respective bandwidth portion of the MNO using radio frequency (RF) spectrum under the PAL or GAA and each MNO of the plurality of MNOs operates as a different Citizens Broadband Radio Service Device (CBSD) of a plurality of CBSOs due to using the respective bandwidth portion made available by the RU apportioned to the MNO to send the cellular wireless telecommunication network traffic between the UE to which the MNO provides cellular wireless telecommunication service and another device.

* * * * *